Dec. 19, 1950 J. E. ENGLUND 2,534,761
DEPTH CONTROL FOR TRACTOR-DRAWN IMPLEMENTS
Filed July 8, 1949 2 Sheets-Sheet 1
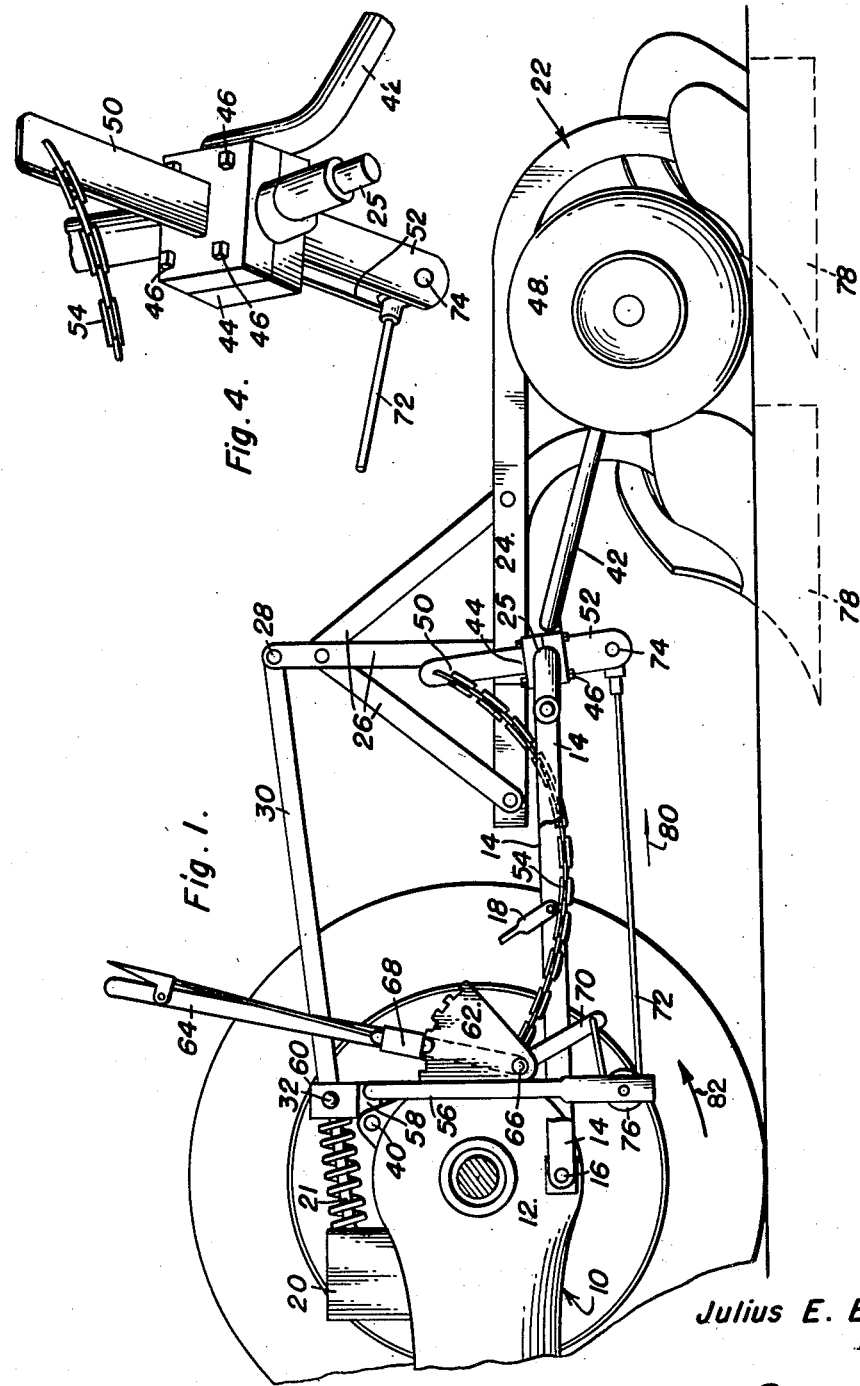
Julius E. Englund
INVENTOR.

Dec. 19, 1950  J. E. ENGLUND  2,534,761
DEPTH CONTROL FOR TRACTOR-DRAWN IMPLEMENTS
Filed July 8, 1949  2 Sheets-Sheet 2

Julius E. Englund
INVENTOR.

BY Clarence A. O'Brien
and Harvey B. Jackson
Attorneys

Patented Dec. 19, 1950

2,534,761

UNITED STATES PATENT OFFICE 2,534,761

DEPTH CONTROL FOR TRACTOR-DRAWN IMPLEMENTS

Julius E. Englund, Fenton, Mich.

Application July 8, 1949, Serial No. 103,715

6 Claims. (Cl. 97—50)

1

This invention relates to new and useful improvements and structural refinements in means for controlling the operating depth of implements such as plows, cultivators, etc., which are drawn by a tractor, and the principal object of the invention is to maintain the implement at constant, predetermined operating depth, regardless of surface irregularities and texture of the soil through which the implement travels.

In particular, the invention concerns itself with controlling implements drawn by "Ford", "Ferguson" or "Ford-Ferguson" tractors, provided with liftable and lowerable implement carriers together with means for automatically maintaining the implement at constant depth notwithstanding rising and falling movement of the tractor when travelling on uneven ground.

While a conventional control of this type is quite satisfactory for maintaining constant depth regardless of surface irregularities of the ground, it is not capable of equalizing variations in the operating depth of the implement caused by different textures of soil. In other words, assuming that the implement travels through relatively hard soil at a certain depth and requires a certain amount of draft, when relatively soft soil is encountered the draft will remain the same but the implement will sink deeper into the ground. Conversely, when operating at a certain depth in soft soil, the implement will rise when hard soil is encountered.

Inasmuch as the conventional control mechanism operates on the principle of constant draft, and inasmuch as under the above circumstances the draft remains constant, it will be seen that the implement will rise and fall in the ground according to the texture of the soil, the conventional control being useless under such circumstances in equalizing the operating depth.

The instant invention, therefore, eliminates the above disadvantage and, as aforesaid, assures constant operating depth of the implement notwithstanding changing ground texture and irregular ground surface.

The object of the invention is achieved by the provision of a ground-engaging member which travels on the surface of the soil immediately adjacent the implement and, by closely following the contour of the surface of the ground, the ground-engaging member functions in the nature of a gauge. Another feature of the invention involves the provision of an operating connection between the ground-engaging member and the conventional control valve for actuating the carrier, whereby any variation in the relative position of the ground-engaging member and implement actuates the control unit and causes the implement to be raised or lowered as necessary for the maintenance of constant, predetermined operating depth.

Some of the advantages of the invention reside in its simplicity of construction, in its accurate operation and in its adaptability to economical manufacture.

With the above more important objects and features in view and such other objects and features as may become apparent as this specification proceeds, the invention consists essentially in the arrangement and construction of parts as illustrated in the accompanying drawings, in which:

Figure 1 is a side elevational view of the invention associated with an agricultural implement and with a tractor drawing the same;

Figure 4 is a fragmentary perspective detail of the subject shown in Figure 3.

Like characters of reference are employed to designate like parts in the specification and throughout the several views.

Figure 3:
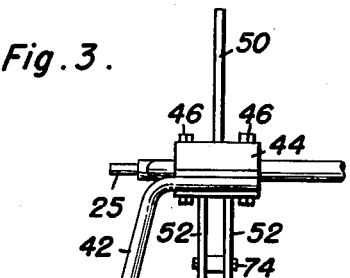
Figure 3 is a fragmentary rear elevational view of the invention.

Referring now to the accompanying drawings in detail, the general reference character 10 designates a conventional tractor including a rear axle housing 12 on which is mounted a liftable and lowerable implement carrier of a conventional type, including a pair of supporting arms 14 which are pivoted at their forward ends to the housing 12, as at 16, and are raised or lowered by links 18 which, in turn, are actuated by a hydraulic control unit 20 provided with a spring-pressed plunger 21.

A suitable agricultural implement, such as, for example, a plow, designated generally by the reference character 22, has the frame 24 thereof provided with laterally projecting trunnions 25 whereby it is pivotally connected to the arms 14. The frame 24 is also equipped with an upwardly extending, substantially triangular frame extension 26 which is pivotally connected, as at 28, to a push rod or bar 30. The latter, in accordance with the well known "Ferguson" system, has its forward end connected, as at 32, to the spring-pressed plunger 21 actuating the hydraulic unit 20 which, in turn, controls the lifting and lowering of the implement carrier through the medium of the links 18.

The connection 32 simply assumes the form of a horizontal pivot pin which extends transversely through the plunger 21 and is supported by a bracket 38 secured to the housing 12 by a pivot pin 40.

The structure thus described is, of course, of a conventional nature, and the instant invention resides in the provision of a depth control which is intended to regulate the operating depth of the implement 22 in advance and independently of the conventional control mechanism 20, 21, 30, 26, the improved depth control involving the provision of a crank member 42 which has an angulated end portion secured by welding, or the like, to one section of a split clamp 44, the latter consisting of two sections which are secured together by a plurality of bolts 46 and are pivotally mounted on one of the aforementioned trunnions 25, as will be clearly apparent.

By virtue of this arrangement, the crank member 42 is swingable in a vertical plane, and it is to be noted that the free end portion of the crank member is angulated horizontally so as to rotatably support a ground-engaging member in the form of a wheel 48.

The clamp member 44 is provided with an upwardly extending arm 50 and with a downwardly extending arm 52, the upwardly extending arm 50 having connected thereto one end of a slack length of chain, or the like, 54, the remaining end of which is anchored to the tractor housing 12 in any suitable manner.

A substantially L-shaped actuating member 56 is provided on one arm or portion thereof with a pair of bearing blocks 58 which are pivotally mounted on the aforementioned pin 40, while a pair of upwardly extending cranks or brackets 60 are secured to the actuating member 56 adjacent the blocks 58 and have the aforementioned pin 32 extending transversely therethrough. It will be apparent from the foregoing that the actuating member 56 is swingable about the pin 40, during which action the brackets 60 will slide the spring-pressed plunger 21, thus actuating the unit 20 in much the same manner as when this unit is actuated through the medium of the push bar or rod 30.

Figure 2:
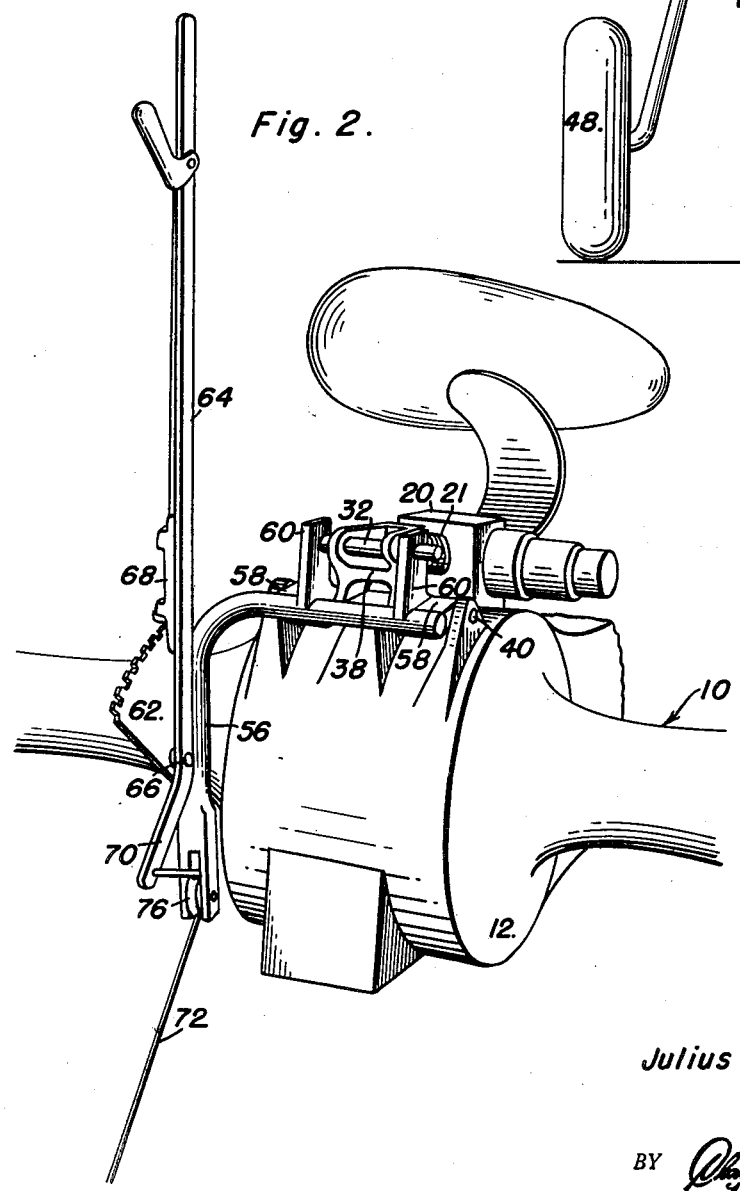
Figure 2 is a fragmentary perspective view of the actuating member and adjusting lever used in the invention.

A toothed sector 62 is secured by welding, or the like, to the actuating member 56 and an adjusting lever 64 is pivoted as at 66 to the sector 62, this lever being provided with a conventional latch mechanism 68 whereby it may be locked in any predetermined position on the sector. It is to be noted that the lever 64 is provided with an extension 70, the latter having connected thereto one end of a flexible element, such as for example, a cable 72, the remaining end of which is anchored to the arm 52 of the crank member 42, as at 74. However, it will be observed that the cable 72 passes around a pulley 76 rotatably mounted on the actuating member 56, as is best shown in Figures 1 and 2.

When the invention is placed in use, the conventional depth control mechanism 20, etc., is adjusted to operate at a substantially greater depth than the implement is to be operated, and, as a result, controlling of the depth of operation of the implement depends entirely on the invention itself. That is to say, assuming the tractor to travel along the ground with the plow shares 78 operating at a certain, predetermined depth, with a constant draft, when a soft spot in the ground is encountered, the plow shares will have a tendency to sink deeper, but since the engagement of the wheel 48 with the ground surface does not permit the wheel to fall, the relative downward movement of the implement with respect to the wheel will exert a pulling force in the direction of the arrow 80 on the cable 72, this, in turn, swinging the actuating member 56, as at 82 (see Figure 1), and causing the plunger 21 to actuate the control unit 20 so as to automatically raise the arms 14 and return the implement to its normal depth. Conversely, when a relatively hard spot in the ground is encountered by the plow shares, the implement has a tendency to rise, thus slackening the cable 72 and permitting the spring on the plunger 21 to actuate the control unit 20 so as to lower the arms 14 and again equalize the operating depth of the implement.

It is to be also noted that similar conditions prevail and constant depth is similarly maintained in instances of ground surface irregularities, such as for example, when the front wheels of the tractor climb over a ridge, in which event there is a tendency for the implement to sink deeper into the ground, or when the front wheels enter a depression, in which event there is a tendency for the implement to rise. In either instance, the ground-engaging wheel 48 functions as a gauge, so that any tendency to produce a variation in the level of the wheel and the level of the implement is immediately counteracted so as to maintain the implement at constant depth.

It will be observed that inasmuch as the connection 74 of the cable 72 is disposed close to the adjacent trunnion 25, and inasmuch as the opposite end of the cable 72 is connected to the extension 70 and to the actuating member 56 in the immediate proximity of the pivots 16 of the arms 14, the cable 72 closely approximates the radius and arc of the swinging motion of the arms 14 about the pivots 16 so that the accuracy of the control is not materially affected by the raising and lowering movement of the carrier.

The adjustment facilitated by the lever 64 and the sector plate 62 increases or decreases the effective length of the cable 72, whereby the operating depth of the implement may be pre-adjusted, as desired. Moreover, it is to be noted that the element or chain 54 prevents the crank member 42 and the wheel 48 from being lowered excessively when the entire implement carrier and implement are raised above the ground, such as for example, when turning corners, thus assuring that the crank member 42 will always assume the rearwardly extending position shown in Figure 1 rather than swinging forwardly of the associated trunnion 25 when the carrier is lowered.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. The combination of a tractor having a conventional liftable implement carrier including a pair of supporting arms, and a control valve mounted on the tractor and provided with a spring-pressed actuating plunger, an implement having trunnions pivoted in said arms, and a depth control mechanism comprising a crank member pivotally mounted on one of said trunnions and swingable in a substantially vertical plane, a ground-engaging element provided on said crank member, an actuating member pivoted to said tractor and engaging said plunger, and flexible connecting means extending between said crank member and said actuating member.

2. The device as defined in claim 1 together with means for adjusting said connecting means to vary the position of said crank member relative to said actuating member.

3. The device as defined in claim 2 wherein said adjusting means comprise an adjusting lever pivoted to said actuating member, said connecting means being attached to said lever.

4. The device as defined in claim 1 wherein said connecting means comprise a flexible cable.

5. The device as defined in claim 1 together with an adjusting lever pivoted to said actuating member, and a pulley rotatably mounted on the actuating member, said connecting means comprising a flexible cable having one end thereof attached to said crank member, said cable passing around said pulley and having its remaining end anchored to said lever, whereby the position of said crank member relative to said actuating member may be adjusted.

6. The device as defined in claim 1 together with means for restricting the extent of downward swinging movement of said crank member.

JULIUS E. ENGLUND.

REFERENCES CITED

The following references are of record in the file of this patent:

UNITED STATES PATENTS

| Number | Name | Date |
|---|---|---|
| 2,249,807 | Brown | July 22, 1941 |
| 2,405,334 | Silver | Aug. 6, 1946 |

FOREIGN PATENTS

| Number | Country | Date |
|---|---|---|
| 520,484 | Great Britain | Apr. 25, 1940 |
| 541,436 | Great Britain | Nov. 26, 1941 |